United States Patent [19]
Hefner, Jr.

[11] Patent Number: 4,755,570
[45] Date of Patent: Jul. 5, 1988

[54] POLYSULFIDE MODIFIED EPOXY RESINS

[75] Inventor: Robert E. Hefner, Jr., Lake Jackson, Tex.

[73] Assignee: The Dow Chemical Company, Midland, Mich.

[21] Appl. No.: 53,922

[22] Filed: May 26, 1987

Related U.S. Application Data

[62] Division of Ser. No. 882,641, Jul. 7, 1986, Pat. No. 4,692,500.

[51] Int. Cl.$^4$ ............................................ C08F 283/10
[52] U.S. Cl. ................................... 525/529; 525/531; 525/535
[58] Field of Search ........................ 525/529, 531, 535

[56] References Cited

U.S. PATENT DOCUMENTS 3,063,971 11/1962 Stuart et al. ...................... 525/529
4,438,259 3/1984 Meyer et al. ...................... 528/388

FOREIGN PATENT DOCUMENTS 1164008 2/1964 Fed. Rep. of Germany ...... 525/529

Primary Examiner—Lewis T. Jacobs
Assistant Examiner—Robert E. L. Sellers, II

[57] ABSTRACT

This invention relates to polysulfide modified epoxy resins with enhanced physical and mechanical properties. The composition comprises the copolymerization product of epoxy resins and (vinylaryl)alkyl substituted polysulfides. Such compositions are useful in coating formulations and structural and electrical applications.

9 Claims, No Drawings

POLYSULFIDE MODIFIED EPOXY RESINS

This is a divisional of co-pending application Ser. No. 882,641, filed July 7, 1986, now U.S. Pat. No. 4,692,500, issued Sept. 8, 1987.

BACKGROUND OF THE INVENTION

This invention relates to polysulfide modified epoxy resins.

Epoxy resins are well known in the art and have been used commercially for years. Typical epoxy resins are diglycidyl ethers of bisphenol A derived from bisphenol A and epichlorohydrin. Their widespread use in protective coatings and electrical and structural applications are a result of their exceptional combination of properties such as toughness, adhesion, chemical resistannce and superior electrical properties.

Polysulfide polymers are also well known in the art and have been used commercially for many years, see, for example, U.S. Pat. Nos. 1,890,191 and 2,466,963. Such polysulfide polymers are prepared by copolymerizing metal polysulfides and polyfunctional aliphatic hydrocarbons. A very high molecular weight rubber is thereby formed, which is then cleaved with sodium hydrogen sulfide and sodium sulfite to yield a lower molecular weight mercaptan-terminated polymer. These mercaptan-terminated polymers may be cured by the use of oxidants such as metal oxides to form rubbers with desirable properties such as flexibility, adherence, resistance to light, heat, oxygen, oils, solvents and abrasion. However, the mercaptan end groups of these polymers impart a strong, disagreeable odor which limits the practical utility of these polymers.

(Vinylaryl)alkyl-terminated polysulfides prepared from a metal polysulfide and a (vinylaryl)alkyl compound are disclosed by Meyer and Dergazarian in U.S. Pat. No. 4,438,259 as lacking the strong disagreeable odors of conventional mercaptan-terminated polysulfides. Such (vinylaryl)alkyl-terminated polysulfides are curable and exhibit the desirable properties typical of the mercaptan-terminated polysulfides without the disagreeable odor. These polysulfides have utility in adhesive, sealant and caulking compositions.

SUMMARY OF THE INVENTION

The present invention is the polysulfide modified epoxy resin composition comprising the copolymerization product of an epoxy resin with a (vinylaryl)alkyl substituted polysulfide, advantageously in the presence of an effective amount of a free radical forming catalyst. One or more compounds containing a polymerizable ethylenically unsaturated group may also be present in the copolymerization to form the aforesaid polysulfide modified epoxy resin.

In another aspect, the present invention is the polysulfide modified epoxy resin composition comprising the copolymerization product of an epoxy resin, a compound possessing a group reactive with an epoxide group and a polymerizable ethylenically unsaturated group, and a (vinylaryl)alkyl substituted polysulfide. The copolymerization reaction may also include one or more compounds containing polymerizable ethylenic unsaturation.

In a further aspect, the present invention is a polysulfide modified epoxy resin composition with enhanced physical properties. The composition comprises the copolymerization product of an epoxy resin containing a polymerizable amount of ethylenic unsaturation and a (vinylaryl)alkyl substituted polysulfide. Optionally, one or more compounds containing polymerizable ethylenic unsaturation may also be present in the copolymerization to form the polysulfide modified epoxy resin.

In yet another aspect, the present invention is a cured polysulfide modified epoxy resin composition.

The polysulfide modified epoxy resins of the present invention provide cured compositions with enhanced mechanical properties such as tensile strength, elongation and the like, while largely retaining other desirable mechanical properties such as chemical resistance, adhesion, and toughness. Such compositions are useful in a wide variety of applications in which conventional epoxy resins are now used.

DETAILED DESCRIPTION OF THE INVENTION

The polysulfide modified epoxy resin composition of this invention is advantageously prepared by the copolyaerization of an epoxy resin containing ethylenic unsaturation with a (vinylaryl)alkyl substituted polysulfide or by copolymerization of an epoxy resin, a compound possessing a group reactive with an epoxide group and a polymerizable ethylenically unsaturated group and a (vinylaryl)alkyl substituted polysulfide. The polysulfide modified epoxy resins may also comprise the copolymerization product of an epoxy resin with a (vinylaryl)alkyl substituted polysulfide in the presence of an effective amount of a free radical forming catalyst Optionally, one or more compounds containing a polymerizable ethylenically unsaturated group may be present in the copolymerization to form the polysulfide modified epoxy resin.

Suitable epoxy resins useful in the preparation of the polysulfide modified epoxy resin compositions of the present invention are generally those known in the art, characterized by the presence of a three-membered cyclic ether group commonly referred to as an epoxy group, 1,2-epoxide, or oxirane. Examples of suitable epoxy resin compositions are represented by the formulae:

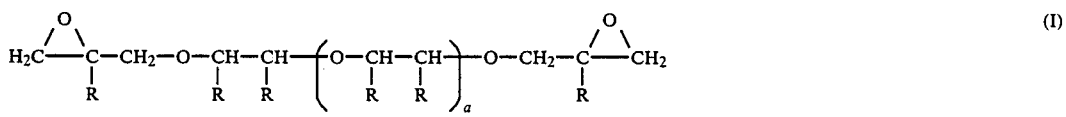 (I)

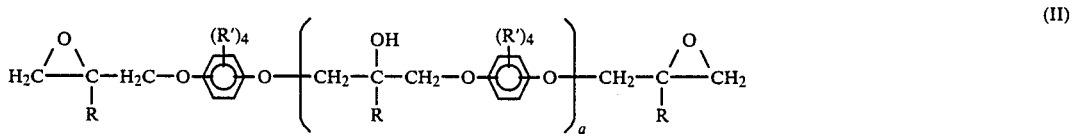 (II)

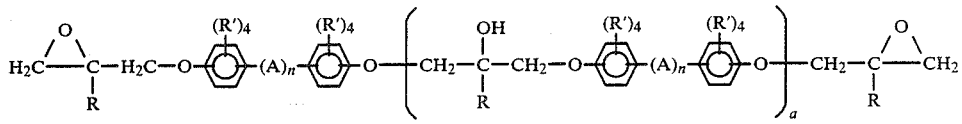

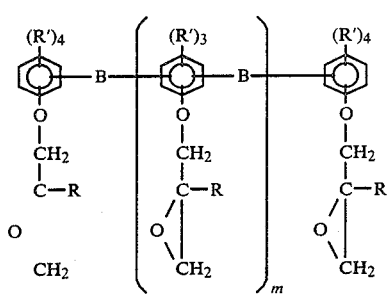

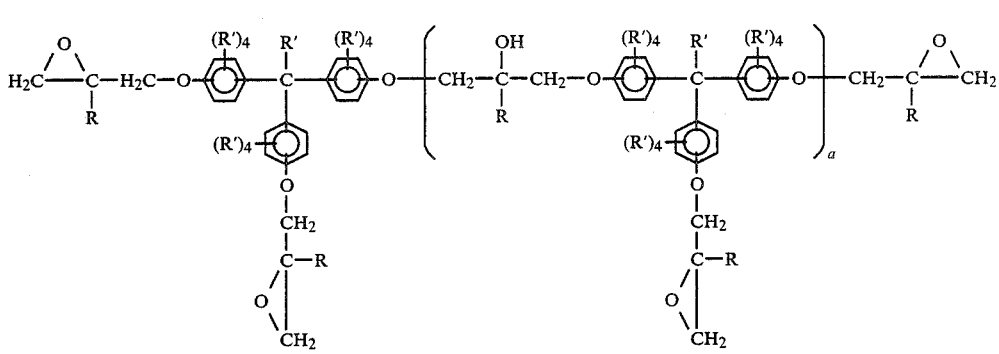

wherein A is a divalent hydrocarbon group having from 1 to about 12, preferably from 1 to about 6 carbon atoms, —S—, —S—S—,

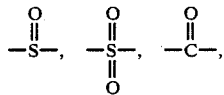

—O—, and the like; B is a divalent hydrocarbon group having from 1 to about 3, preferably 1, carbon atoms or a

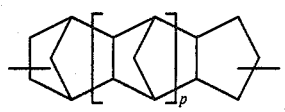

group; p has a value of from zero to about 10, preferably from zero to 3; R' is independently, at each occurrence, hydrogen, a hydrocarbyl or hydrocarbyloxy group having from 1 to about 10 carbon atoms or a halogen, preferably chlorine or bromine; R is independently, at each occurrence, hydrogen or a hydrocarbyl group having from 1 to about 3 carbon atoms; n has a value of zero or 1; a has a value of from zero to about 40, preferably from 0.1 to about 5; m has a value of from about 0.001 to about 6.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

Generally, the epoxy resins are employed in an amount ranging from about 1 to about 99 percent by weight, preferably from about 25 to about 95 percent by weight and most preferably from about 50 to about 90 percent by weight.

The (vinylaryl)alkyl substituted polysulfide may be of the type having the general formula

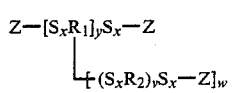

wherein $R_1$ and $R_2$ at each occurrence are independently polyvalent organic polyradicals with each valence residing on a carbon atom; each Z is independently (vinylaryl)alkyl, inertly substituted (vinylaryl)alkyl or a noncrosslinking monoradical, provided that at least 5 mole percent of at least one Z group contain vinylaryl moieties; y and v are independently zero or a positive integer, x is a number from about 1 to about 8; and w is zero or a positive integer which is the difference between the valence of $R_1$ and two. (Vinylaryl)alkyl substituted polysulfides of the aforementioned type taught by U.S. Pat. No. 4,438,259, which is herein incorporated by reference, are generally suitable for the practice of the present invention.

In making the (vinylaryl)alkyl substituted 25 polysulfides, a metal polysulfide is reacted with a (vinylaryl)alkyl compound represented by the formula:

V-Ar-Y-X wherein Ar is an unsubstituted or inertly substituted arylene group such as phenylene, naphthylene, phenanthrylene, biphenyl and the like; V is an unsubstituted or inertly substituted vinyl group; Y is an alkylene group and X is a negatively charged functionality which will split off upon reacting with the metal polysulfide in the reaction mixture. By inertly substituted is meant that the substituent group does not chemically react under conditions of the polymerization reaction or the subsequent curing of the polymer. Exemplary inert substituents include alkyl groups or either the vinyl or arylene groups, or halogen substituents on the aromatic ring. Y may be a straight chain, cyclic or branched alkylene group, although straight chained groups having fewer than 8, preferably fewer than 5, most preferably 1, carbon atoms are preferred. More preferably, the (vinylaryl)alkyl compound is vinylbenzyl chloride, bromide or iodide, with chloride being most preferred.

Polysulfide polymers are formed by introducing, in addition to the (vinylaryl)alkyl compound, an organic compound having a plurality of negatively charged functionalities attached to aliphatic or cycloaliphatic carbon esters, which functionalities will split off upon reacting with the metal sulfide in the reaction mixture. As used herein, the term "negatively charged functionality" means a functinal group which will split off on reacting with the metal polysulfide to form an anionic species in solution. The functional group is not necessarily ionically bonded to the aliphatic hydrocarbon or (vinylaryl)alkyl compound, and, in fact, is generally covalently bonded thereto. The polymerization of polysulfides and polyfunctional organic compounds are well known in the art and is first described in U.S. Pat. No. 1,890,191 to Patrick. Suitable polyfunctional compounds include alkyl dihalides, disulfates, diacetates and the like which will polymerize with the polysulfide and the (vinylaryl)alkyl compound to form a linear polymer. In general, chlorides are preferred as the negatively charged functional group due to the facility of their reaction with metal polysulfides, their relatively low cost and high availability. The $R_1$ or $R_2$ group, and correspondingly, the polyfunctional organic compound may further contain substituents which are inert under the conditions of the polymerization reaction and may further incorporate linkages such as ether, sulfide, alkene or arylene into the chain. In general, those polyfunctional monomers previously known to react with metal polysulfides to form polymers therewith are also suitably employed in this invention. Preferred polyfunctional monomers include dichloroethane, 1,2,3-trichloropropane, bis-2-chloroethyl formal, bis-4-chlorobutyl ether, bis-4-chlorobutyl formal 1,4-dichloro-2-butene and 1,3-dichloro-2-propanol. Other polyfunctional monomers which are illustrative of the wide scope of monomers suitably employed herein include, for example, bis-(4-chloromethyl)phenyl ether, bis(4-chloroacetyl)phenyl ether, 2,5'-di(chloromethyl)-1,4-dioxane, and diethylene glycol bis(chloroacetate). The curing of the polysulfide modified epoxy resin is enhanced if hydroxy functionalities are present in the (vinylaryl)alkyl substituted polysulfide polymer chain. Hydroxy functionalities are preferably introduced into the polymer chain by employing as one of the organic monomers a polyfunctional hydroxy-containing organic compound such as 1,3-dichloro-2-propanol.

Preferably, the (vinylaryl)alkyl polysulfides have at least two vinyl-reactive groups. However, this is not required; (vinylaryl)alkyl polysulfides represented by Formula VI wherein 5 mole percent of only one Z group contains vinylaryl moieties are considered suitable for the practice of the present invention. In fact, such polysulfides are preferred for copolymerization with an epoxy resin wherein a portion of the epoxide groups of an epoxy resin represented by Formulae IV or V have been converted to groups containing polymerizable ethylenic unsaturation. Alternatively, a total of two or three vinylaryl groups are advantageous for copolymerization with an epoxy resin wherein a portion of the epoxide groups of an epoxy resin represented by Formulae I, II or III have been converted to groups containing polymerizable ethylenic unsaturation. A total of 1 to 2 vinylaryl groups is especially advantageous for copolymerization with an epoxy resin wherein a portion of the epoxide groups of the epoxy resin have been converted to groups containing polymerizable ethylenic unsaturation and at least one polymerizable ethylenically unsaturated compound.

Generally, the most suitable (vinylaryl)alkyl substituted polysulfides presently known are reaction products of (1) a vinyl benzyl halide or a mixture of a vinyl benzyl halide and a benzyl halide, (2) an alkyl dihalide or a bis(haloalkyl) formal or an alkylene dihalide and (3) disodium disulfide or disodium tetrasulfide.

The (vinylaryl)alkyl substituted polysulfide is generally employed in an amount ranging from about 1 to about 99 percent by weight, preferably from about 3 to about 75 percent by weight, most preferably from about 5 to about 50 percent by weight.

Suitable polymerizable ethylenically unsaturated compounds generally are those commonly copolymerized with monomers having terminal or pendant, vinyl-reactive, olefinic or cycloolefinic double bonds. Such monomers are well known in the prior art. Typical of such monomers are vinyl aromatic monomers such as styrene, vinyl toluene, t-butyl styrene, divinylbenzene, chlorostyrene, vinyl naphthalene, $\alpha$-methyl styrene and mixtures thereof. Additional monomers include acrylate monomers such as n-butyl acrylate, sec-butyl acrylate, dicyclopentadienyl acrylate, 2-ethylhexyl acrylate, 2-ethylhexyl methacrylate, ethyl acrylate, cyclohexyl acrylate and allyl monomers such as diallyl phthalate, and mixtures thereof.

Generally, the suitable polymerizable ethylenically unsaturated compounds may be used in amounts ranging up to about 75 percent by weight, preferably up to about 50 percent by weight and most preferably up to about 25 percent by weight.

The ethylenic unsaturation is supplied to the epoxy resins of Formulae I, II, III, IV, and V by reacting the epoxy resin with suitable compounds possessing a group reactive with an epoxide group and a polymerizable ethylenically unsaturated group Representative of said compounds are the alkenylphenols such as p-isopropenylphenol, m-vinylphenol, 4-isopropenyl-2-methylphenol, p-allylphenol, o-allylphenol; the acrylic acids such as acrylic acid and methacrylic acid; the allyl alcohols such as allyl alcohol and methallyl alcohol; the hydroxyalkylacrylates such as 2-hydroxy ethylacrylate, 2-hydroxypropylacrylate and 2-hydroxyethyl methacrylate; the aminoalkylacrylates such as t-butylaminoethyl methacrylate; the monoesterified $\alpha,\beta$-unsaturated dicarboxylic acids such as fumaric acid methyl monoester, maleic acid ethyl monoester and itaconic acid methyl monoester; the alkenylphenyl glycidyl ethers such as p-isopropenylphenyl glycidyl ether and m-vinylphenyl glycidyl ether; the glycidyl acrylates such as glycidyl acrylate and glycidyl methacrylate; and the acrylamides such as acrylamide, methacrylamide, mixtures thereof and the like. Most preferred as the compound for reaction with one or more of the epoxy resins is methacrylic acid or acrylic acid.

A suitable catalyst is optionally employed to facilitate reaction of the aforesaid compound possessing a group reactive with an epoxide group and a polymerizable ethylenically unsaturated group and the epoxy resin. Said catalysts are well known and include, for example, quaternary ammonium salts and phosphonium salts useful for the reaction of alkenylphenols and hydroxyalkylacrylates with the epoxide group. As an additional specific example, catalysts useful for the reaction of acrylic acids and monoesterified α,β-unsaturated dicarboxylic acids with the epoxide group include phosphonium salts such as ethyltriphenylphosphonium acetate.acetic acid complex, tertiary amines such as tris(dimethylaminoethyl)phenol, and metal salts such as chromium trichloride and chromium acetate. If desired, it is possible to incorporate a polymerization inhibitor into the reaction mixture in order to reduce the possibilty of premature vinyl polymerization of the ethylenically unsaturated groups prior to completion of reaction of the carboxylic acid groups and epoxide groups. Examples of such inhibitors include hydroquinone and 2,6-di-tertiary-butyl-4-methylphenol. Said catalysts are typically used in amounts of from about 0.1 to about 2 percent by weight of the total reactants used.

The epoxy resin wherein a portion of the epoxide groups have been converted to groups containing polymerizable ethylenic unsaturation are most preferably prepared in situ by reaction of a compound possessing a group reactive with an epoxide group and a polymerizable ethylenically unsaturated group. This in situ reaction may be performed in the presence of the (vinylaryl)alkyl substituted polysulfide and polymerizable ethylenically unsaturated compound, if used. The resulting product is an epoxy resin wherein a portion of the epoxide groups have been converted to groups containing polymerizable ethylenic unsaturation. Alternately, the epoxy resin wherein a portion of the epoxide groups have been converted to groups containing polymerizable ethylenic unsaturation can be prepared separately and added to an epoxy resin before or during copolymerization with the (vinylaryl)alkyl substituted polysulfide and, optionally, a polymerizable ethylenically unsaturated compound.

The compound possessing a group reactive with an epoxide group and a polymerizable ethylenically unsaturated group is employed in an amount sufficient to react with from about 0.01 to about 10 mole percent preferably about 0.05 to about 6 mole percent and most preferably about 0.1 to about 3 mole percent of the epoxide groups to provide groups containing polymerizable ethylenic unsaturation.

The polymerizable ethylenically unsaturated compound optionally used in the preparation of the polysulfide modified epoxy resin compositions can be preblended with the (vinylaryl)alkyl substituted polysulfide prior to addition to the epoxy resin containing polynerizable ethylenic unsaturation. The preblended composition may also be added to the mixture of the epoxy resin, the compound possessing a group reactive with an epoxide group and a polymerizable ethylenically unsaturated group. Alternatively, either the polymerizable ethylenically unsaturated compound or the (vinylaryl)alkyl substituted polysulfide may be first added to the epoxy resin containing polymerizable ethylenic unsaturation or to the mixture of the epoxy resin and the compound possessing a group reactive with an epoxide group and a polymerizable ethylenically unsaturated group. Such addition may be made in aliquots or continuously.

A suitable catalyst is optionally employed to facilitate the copolymerization of the polysulfide compound and the groups containing ethylenic unsaturation provided by the compound possessing a group reactive with an epoxide group and a polymerizable ethylenically unsaturated group. Said catalysts are well known free radical-forming catalysts, for example, the organic peroxides and hydroperoxides such as benzoyl peroxide, di-tert-butyl peroxide, t-butyl peroxybenzoate, and t-butylhydroperoxide. Further, suitable catalysts include the azo and diazo compounds such as azobisisobutyronitrile. It is also operable to use mixtures of said free radical-forming catalysts. Such catalysts are typically used in amounts ranging from about 0.1 to about 5 percent by weight.

Reaction temperatures ranging from about 40° to about 200° C. are used for the copolymerization. Preferably, the temperature ranges from about 80° to about 150° C. are preferred. The time of reaction ranges from about 15 minutes to about 8 hours with a reaction time ranging between 30 minutes to about 4 hours being preferred.

The copolymerization can also be carried out with an inert solvent present. Representative of suitable solvents are xylene, toluene, methyl chloroform, methyl amyl ketone and the like.

The copolymerization is preferably carried out in the presence of an inert atmosphere. Typical inert atmospheres include nitrogen, argon and the like.

The product resulting from the copolymerization is a polysulfide modified epoxy resin containing chemically bonded residues derived from the (vinylaryl)alkyl substituted polysulfide and, optionally, the polymerizable ethylenically unsaturated compound. It is known from U.S. Pat. No. 4,438,259 that cleavage of polysulfide linkages and subsequent reaction of the terminal sulfur radicals with vinyl groups in a rearrangement reaction can occur to produce a homopolymer of the (vinylaryl)alkyl substituted polysulfide. In a similar fashion it is proposed that cleavage of polysulfide linkages and subsequent reaction of the terminal sulfur radicals with vinyl groups of the epoxy resin containing polymerizable ethylenic unsaturation can occur during the copolymerization reaction. Further, the free radical-indiced vinyl to vinyl homo- and copolymerization reactions are also proposed to occur. The extent of these two types of reactions occurring during the copolymerization may be influenced by the presence or absence of a free radical-forming catalyst as well as the amount and type. The polysulfide modified epoxy resin may also contain non-chemically bonded homo- and copolymers of the (vinylaryl)alkyl substituted polysulfide and the polymerizable ethylenically unsaturated compound, if used.

When an epoxy resin and a (vinylaryl)alkyl substituted polysulfide and, optionally, one or more polymerizable ethylenically unsaturated compounds are copolymerized, advantageously an effective amount of one or more of the previously described free radical-forming catalysts is employed. Generally, the (vinylaryl)alkyl substituted polysulfide and free radical-forming catalyst are blended prior to addition to the epoxy resin using previously delineated reaction times and temperatures. Alternatively, the (vinylaryl)alkyl substituted polysulfide and the free radical-forming catalyst are added to the epoxy resin as separate components either in aliquots or continuously. When the epoxy resin used is of formulae II, III or V, it is desirable for "a" to have a value of at least 1 or more such that

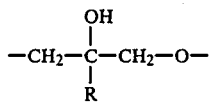

linkages are present in the epoxy resin backbone. An effective amount of the aforesaid free radical-forming catalyst is that amount which induces a grafting reaction between a portion of the (vinylaryl)alkyl substituted polysulfide and the epoxy resin backbone, generally about 1 to about 10 percent by weight is employed, preferably about 3 to about 8 percent by weight.

Suitable curing agents for curing the polysulfide modified epoxy resins are described in the *Handbook of Epoxy Resins* by Lee and Neville, McGraw-Hill (1967), as well as U.S. Pat. Nos. 3,477,990; 3,948,855; and 4,366,295, which are incorporated herein by reference.

The polysulfide epoxy resin compositions of the present invention are also well suited for advancement reaction with a polyphenol, such as bisphenol A, to provide polysulfide modified advanced epoxy resins. Advancement reactions are well known in the art and are described in the aforementioned *Handbook of Epoxy Resins*, by Lee and Neville, McGraw-Hill (1967).

The polysulfide epoxy resins of the present invention are useful to make laminates, castings, coatings, encapsulations, protective film compositions, and the like. The laminates are made by curing the polysulfide modified epoxy resin to which a suitable fibrous reinforcement such as asbestos fibers, carbon fibers, fibrous glass, aramid fibers or inorganic fibers has been added. The fibers may be in the form of mats, strands, sheets, filaments, yarns, chopped strands, ribbons and the like. The polysulfide modified epoxy resin formulation can be rolled, sprayed or impregnated into the fibrous reinforcement. The protective film compositions are advantageously applied to solid substrates to form a protective barrier for the solid substrate.

The polysulfide modified epoxy resins may be compounded with solvents, pigments, fire suppressants, low profile additives, fillers or other resinous products and cured to form useful coatings.

The compositions of the present invention have properties that make them well adapted for molding, pultrusion, encapsulation, filament winding, injection molding and other known fabrication procedures. A preferred use is in coatings where toughness is necessary, yet a high degree of corrosion resistance, processability and no objectionable odor are still required. Typical of these applications are stone chip resistant automotive coatings, encapsulations for electronic components, corrosion protective pipe coatings and maintenance coatings for concrete, steel and the like.

The following examples are illustrative and are not intended to limit the scope of the invention in any way.

EXAMPLE 1

Preparation of (Vinylaryl)alkyl Polysulfide Sample

Hydrated disodium sulfide, 139.3 g (0.58 mole), is dissolved into 290 g of deionized water in a reactor equipped with a stirrer, heating mantle, and temperature controller, a thermometer and a reflux condensor. 18.6 g (0.58 mole) of precipitated sulfur is added to the reactor followed by heating to reflux for 1.25 hours. The resulting mixture of disodium disulfide with an average composition of Na+S−S−Na+ is cooled to 75° C. and 77.2 g of the mixture is removed from the reactor. A solution of 0.7 g of sodium lauryl sulfate in 15 g of deionized water is added to the mixture remaining in the reactor followed by addition of 25.8 g (0.161 mole NaOH) of 25 percent aqueous sodium hydroxide. Hydrated magnesium chloride (16.5 g, 0.081 mole) dissolved in 50 g of deionized water is added over a 5-minute period. The reactor is heated to 90° C. and a mixture of 61.0 g (0.40 mole) of vinylbenzylchloride and 37.4 g (0.20 mole) of 1,2-bis(2-chloroethoxy)ethane is added over a 1.25-hour period under conditions which maintain the 90° C. reaction temperature. The reactor is maintained at 90° C. for an additional hour, and then 750 g of deionized water is added to the reactor. The reactor contents are added to a separatory funnel and allowed to stand for 12 hours. The product is recovered, heated to 75° C., then washed with 750 g of deionized water. After one hour the product is recovered and washed again with 750 g of deionized water for one hour. The product is then recovered and added to the reactor along with the 77.2 g of aqueous disodium disulfide which was removed earlier. The mixture is then heated to 75° C. under stirring conditions for 30 minutes. The product is washed three times with 750 g portions of deionized water. The washed product is then dried. Nuclear magnetic resonance spectroscopy and infrared spectrophotometric analysis are used to determine the following statistical product structure:

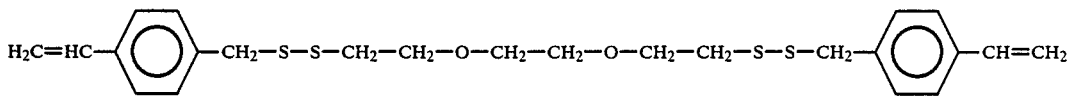

EXAMPLE 2

A. Preparation of a Polysulfide Modified Epoxy Resin - 10 Percent by Weight (Vinylaryl)alkyl Polysulfide A 450 g portion of a diglycidyl ether of bisphenol A having an epoxide equivalent weight (EEW) of 181.53 is added to a reactor and heated with stirring under a nitrogen atmosphere until a temperature of 150° C. is achieved. At that time, a mixture of glacial methacrylic acid (4.27 g, 0.0496 mole), t-butylperoxybenzoate (3 percent by weight of polysulfide and methacrylic acid used, 1.628 g), and a (vinylaryl)alkyl substituted polysulfide (50.0 g, 0.1044 mole) is added to the reactor dropwise over a 2.0-hour period under conditions which maintain the 150° C. reaction temperature. The (vinylaryl)alkyl polysulfide sample of Example 1 is used. The reaction is continued at the 150° C. reaction temperature for an additional 2.0 hours. The polysulfide modified epoxy resin product is then recovered as a light amber colored transparent liquid with an epoxide equivalent weight (EEW) of 208.4. The resin is free of odor even when heated to 100° C.

B. Curing of the Polysulfide Modified Epoxy Resin

A 240 g portion of the polysulfide modified epoxy resin of A is heated to 100° C., then thoroughly blended with 57.0 g of 4,4'-diaminodiphenylmethane which has been heated to 100° C. The resulting solution was used to prepare a clear, unfilled ⅛-inch casting which is cured for 2.0 hours at 125° C. and then post cured for 2.0 hours at 177° C. The sample is designated as Sample C-2. The resulting transparent, light amber colored, clear, unfilled casting was used to prepare test pieces for mechanical property evaluations. The tensile and flexural strength of the test pieces were determined using an Instron machine with standard methods (ASTM D-638 and D-790). Heat distortion temperature (264 psi, 1820 kPa) of the clear casting test pieces was determined using an Aminco Plastic Deflection Tester (American Instrument Company) with standard test methods (ASTM D-648 modified). The average Barclo hardness was on the 934-1 scale. The results are illustrated in Table I.

EXAMPLE 3

Preparation of a Polysulfide Modified Epoxy Resin - 20 Percent by Weight (Vinylaryl)alkyl Polysulfide A portion of 400.0 g of a diglycidyl ether of bisphenol A having an epoxide equivalent weight (EEW) of 188.86 is added to a reactor and heated with stirring under a nitrogen atmosphere until a temperature of 150° C. is achieved. At that time, a mixture of glacial methacrylic acid (3.794 g, 0.0441 mole), t-butylperbenzoate (2.076 g, 2 percent by weight of polysulfide and methacrylic acid used), and a (vinylaryl)alkyl substituted polysulfide (100.0 g, 20.0 percent by weight of epoxy resin used) is added to the reactor dropwise over a period of 1.5 hours under conditions which maintain the 150° C. reaction temperature. The (vinylaryl)alkyl polysulfide used has the same statistical structure as the polysulfide sample of Example 1 and included oligomers. Gel permeation chromatographic analysis of the (vinylaryl)alkyl polysulfide revealed a weight average molecular weight of 290.4 with a polydispersity ratio (Mw/Mn) of 24.9 using polystyrene calibration standards. The reaction is continued at the 150° C. reaction temperature for an additional 1.0 hour. The polysulfide modified epoxy resin product is recovered as a light amber colored, transparent liquid and has an EEW of 248.7. The resin is free of objectionable odor, even when heated to 125° C.

The polysulfide modified epoxy resin is cured and tested for mechanical properties in the same manner as described in Example 2-B. This resin is designated Sample 3. The results are illustrated in Table I.

EXAMPLE 4

Preparation of a Polysulfide Modifed Epoxy Resin Using 20 Percent by Weight Polysulfide Component and a Preformed Partial Epoxy Methacrylate Four hundred grams of a diglycidyl ether of bisphenol A having an epoxide equivalent weight (EEW) of 188.6 is added to a reactor and heated with stirring under an air atmosphere until a temperature of 115° C. is achieved. A mixture of glacial methacrylic acid (3.794 g, 0.0441 mole) and ethyltriphenylphosphonium acetate acetic acid complex (0.190 g, 70 percent in methanol) is then added to the reactor. The reaction is continued at 115° C. for an additional 30 minutes, then a nitrogen atmosphere is introduced and heating to 150° C. is begun. When the reaction temperature of 150° C. is achieved, a mixture of t-butylperbenzoate (2.076 g, 2.0 percent by weight of polysulfide and methacrylic acid used), and a (vinylaryl)alkyl substituted polysulfide (100.0 g, 20.0 percent by weight of the epoxy resin used) is added dropwise over a 1.5-hour period under conditions which maintain the 150° C. reaction temperature. The (vinylaryl)alkyl polysulfide used has the same structure as the polysulfide sample of Example 1. The reaction is continued at the 150° C. reaction temperature for an additional 1.0 hour. The polysulfide modified epoxy resin is recovered as a light amber colored, transparent liquid and has an epoxide equivalent weight of 242.8. The resin is free of any objectionable odor even when heated to 125° C.

The polysulfide modified epoxy resin is cured and tested for mechanical properties in the same manner as described in Example 2-B. This resin is designated as Sample No. 4. The results are illustrated in Table I.

EXAMPLE 5

Preparation of a Polysulfide (S4) Modified Epoxy Resin

A 450.0 g portion of a diglycidyl ether of bisphenol A having an epoxide equivalent weight (EEW) of 181.53 is added to a reactor and heated with stirring under a nitrogen atmosphere until a temperature of 150° C. is achieved. Thereafter, a mixture of glacial methacrylic acid (0.0496 mole, 4.268 g), t-butylperoxybenzoate (3 percent by weight of polysulfide and methacrylic acid used, 1.628 g) and a (vinylaryl)alkyl substituted polysulfide (0.0964 mole, 50.0 g) is added to the reactor dropwise over a 35-minute period under conditions which maintain the 150° C. reaction temperature. The (vinylaryl)alkyl polysulfide used possesses the following structure:

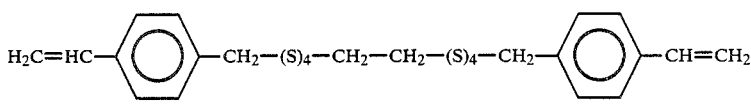

The reaction is continued at the 150° C. temperature for an additional 2.0 hours. The polysulfide modified epoxy resin is recovered as an amber colored, transparent liquid with an EEW of 217.83.

The polysulfide modified epoxy resin is cured and tested for mechanical properties in the same manner as described in Example 2-B. This resin is designated as Sample 5 The results are illustrated in Table I.

EXAMPLE 6

Preapartion of a Polysulfide Modified Epoxy Resin - 20 Percent by Weight Purified Polysulfide Component A polysufide modified epoxy resin is prepared using the method of Example 3 with the exception that the (vinylaryl)alkyl polysulfide used is subjected to column chromatography on an alumina column while in a carbon tetrachloride solution. The chromatographic purification removes a substantial portion of the higher molecular weight oligomers as evidenced by gel permeation chromatodraphic analysis which revealed a weight average molecular weight of 609 with a polydispersity ratio (Mw/Mn) of 7.08 using polystyrene calibration standards. The polysulfide modified epoxy resin is recovered as a light amber colored, transparent liquid with an EEW of 235.75. The resin is free of objectionable odor even when heated to 125° C.

The polysulfide modified epoxy resin is cured and tested for mechanical properties in the same manner as described in Example 2-B. This resin is designated as Sample No. 6. The results are illustrated in Table I.

TABLE I

| Sample No. | Tensile Strength PSI | Percent Elongation | Flexural Strength PSI | Flexural Modulus PSI | Heat Distortion Temperature (°F.) | Barcol Hardness |
| --- | --- | --- | --- | --- | --- | --- |
| C-1* | 10,645 | 5.61 | 19,778 | 445,000 | 329 | 34 |
| 2 | 12,388 | 7.23 | 21,172 | 439,000 | 270.5 | 42 |
| 3 | 12,641 | 8.41 | 23,697 | 515,000 | 227.8 | 42 |
| 4 | 12,809 | 8.81 | 24,033 | 505,000 | 230.9 | 40 |
| 5 | 12,771 | 8.22 | 22,963 | 475,000 | 278 | 44 |
| 6 | 12,832 | 8.26 | 23,935 | 513,000 | 240.4 | 40 |

*Not an example of this invention.
C-1 Diglycidyl ether of bisphenol A, EEW of 181.53, cured and tested in the same manner as described in Example 2-B.
2 Polysulfide modified epoxy resin with 10 percent by weight $(S)_2$ polysulfide.
3 Polysulfide modified epoxy resin with 20 percent by weight polysulfide.
4 Polysulfide modified epoxy resin with 20 percent by weight polysulfide prepared from a preformed partial epoxy methacrylate.
5 Polysulfide modified epoxy resin with 10 percent by weight $(S)_4$ polysulfide.
6 Polysulfide modified epoxy resin with 20 percent by weight purified polysulfide.

The data illustrate the substantial improvements in tensile, flexural strength, and percent elongation for the polysulfide modified epoxy resins compared to a conventional unmodified epoxy resin, Sample C-1*.

EXAMPLE 7

Preparation of a Polysulfide Modified Epoxy Resin Using a Direct Graft Copolymerization A 272.3 g (1.50 epoxide equivalents) portion of a diglycidyl ether of bisphenol A having an epoxide equivalent weight (EEW) of 181.53 and bisphenol A (42.81 g, 0.1875 mole) is added to a reactor and heated with stirring under a nitrogen atmosphere until a temperature of 90° C. is achieved. At that time, ethyltriphenyl phosphonium bromide.acetic acid complex catalyst (0.315 g, 0.1 percent by weight of epoxy resin and bisphenol A used) is added to the reactor and heating of the reactor is resumed. After 10 minutes, a reaction temperature of 150° C. is achieved followed by an exotherm to 158° C. six minutes later. After an additional 54 minutes of reaction, cooling to 115° C. begins. A homogeneous mixture of 98 percent benzoyl peroxide (5.11 g, 6.10 percent by weight of (vinylaryl)alkyl polysulfide used) and styrene (3.0 g) is formed and dissolved in a (vinylaryl)alkyl substituted polysulfide (78.78 g, 20.0 percent by weight of epoxy resin and bisphenol A used). The resultant solution is added to the reactor dropwise over a 1.0-hour period so as to maintain the 115° C. reaction temperature. The (vinylaryl)alkyl polysulfide sample used is identical to that described in Example 1. The reaction is continued at the 115° C. reaction temperature for an additional 2.0 hours, then the polysulfide modified epoxy resin is recovered as a light amber colored, transparent liquid with an EEW of 360.13. The sample is designated as Sample No. 7.

EXAMPLE 8

Preparation and Curing of Coating Formulations Using Polysulfide Modified Epoxy Resins A coating formulation is prepared as a 50 percent by weight solution of resin in a 40:40:20 percent by weight solvent mixture of methylisobutylketone, xylene and propylene glycol monomethylether, respectively. The following components are used in the formulations:

| Resin Source | Resin Weight (grams) | Triethylene-tetramine (grams) | Flow Control Agent[1] (grams) | Designation of the Formulation |
| --- | --- | --- | --- | --- |
| 2 | 13.53 | 1.46 | 0.13 | A |
| 7 | 18.47 | 1.26 | 0.17 | B |
| Diglycidyl Ether of Bisphenol A[2]* | 13.48 | 1.62 | 0.13 | Control |

*Not an example of this invention.
[1] Beetle 216-8, American Cyanamid, urea formaldehyde polymeric flow control agent.
[2] Epoxide Equivalent Weight (EEW) = 189.

A portion of each coating formulation is applied to a Bonderite ® 40 treated 4 inch by 12 inch by 20 gauge unpolished cold rolled steel panel (Oxy Metal Industries Corporation, Parker Division) and cured for 7 days at room temperature (23° to 25° C.).

Each cured coated panel is tested using the following procedures:

Pencil Hardness

This procedure is described in *Paint Testing Manual* by H. A. Gardner and G. G. Sward, 13th edition (1972) pages 283 and 284. Film hardness is determined by drawing a sharp pencil over each coating surface using leads ranging in hardess, hardest to softest: 6B, 5B, 4B, 2B, B, HB, F, H, 2H, 3H, 4H, 5H, 6H. The film hardness value recorded is the hardest lead which does not mar the coating.

Tack Free Time

Each coating is tested for tackiness every 0.1 hour 6 hours after the initial preparation. Testing is done by touching the coated surface with a cotton swab. When the surface has hardened such that adhesion of liquid or gel to the swab is no longer observed, the tack free time is recorded.

Methylethylketone (MEK) Double Rubs

To the ball end of a 2 lb. ball peen hammer is attached a pad of cheese cloth made up of 8 plys. The cheese cloth end of the hammer is then saturated with methylethylketone. The pad end of the hammer is then drawn back and forth across the coated surface One back and forth movement is considered one methylethylketone double rub. The procedure is repeated until the film failed and the number of back and forth motions is recorded.

Glacial Acetic Acid Spot Test

Approximately one milliliter of glacial acetic acid is applied to the coating surface inside a 1 inch by 1 inch square area bordered by teflon tape. A timer is started and the coating is observed until failure occurs, as defined by delamination or bubbling of the coating. At the time of failure, the timer is stopped and the time recorded.

Gardner Impact - Reverse

Impact resistance is determined for each coated panel in accordance with ASTM D-2794. The reverse impact was determined by dropping the dart on the uncoated side of the panel. The reverse impact test values reported are inch-pounds of force required to cause coating cracking.

The results are given in Table II.

TABLE II

| Formulation | Pencil hardness | Tack free time (hr) | Methylethylketone Double Rubs | | | Glacial Acetic Acid Spot Test | | | Gardner reverse impact (in-lb) |
| --- | --- | --- | --- | --- | --- | --- | --- | --- | --- |
| | | | Prerub thickness (mil) | Number rubs | Rubs per mil thickness | Pretest thickness (mil) | Number seconds | Seconds per mil thickness | |
| A | 2B | 8.2 | 2.1 | 133 | 63 | 1.6 | 188.0 | 117.5 | 48 |
| | | | 2.6 | 155 | 60 | 1.8 | 178.7 | 99.3 | |
| B | HB | 4.5 | 3.1 | >300 | >97 | 2.6 | 2733 | 1051 | >160 |
| | | | 2.7 | >300 | >111 | 2.0 | 1663 | 832 | |
| Control* | HB | 8.5 | 1.4 | 34 | 25 | 1.8 | 205.6 | 114.2 | 8 |
| | | | 1.8 | 57 | 31 | 1.9 | 213.2 | 112.2 | |

*Not an example of this invention.

The data illustrate the improvements in properties of epoxy coatings, particularly impact resistance, using the polysulfide modified epoxy resins compared to a conventional unmodified epoxy resin such as a diglycidyl ether of bisphenol A.

EXAMPLE 9

Tensile Lap Shear Strength and Charpy Side Impact Strength of a Polysulfide Modified Epoxy Resin A polysulfide modified epoxy resin prepared by the method of Example 4 and aminoethylpiperazine are combined to form a 1:1 equivalent ratio of epoxide groups to amino hydrogen groups, respectively, thoroughly mixed and degassed under vacuum. The sample is designated as Sample No. 8. The test pieces are prepared from a pair of 1 inch by 4 inches by 63 mil thick cold rolled steel blanks with one side ground. Glass spacer beads (4 mil diameter) are used to regulate resin thickness in the test pieces. The finished test pieces are cured at room temperature (25° C.) for 4 hours followed by post curing at 160° C. for 1 hour. Four pieces are evaluated for tensile lap shear strength using standard methods (ASTM D-1002) utilizing an Instron at a crosshead speed of 0.05-inch per minute. The results are reported in Table III.

Four cured test pieces prepared above are evaluated for Charpy Side Impact Strength by standard methods (General Motors, Fisher Body Division, TM-45-76) employing an Izod impact tester equipped with a Charpy head. The results are illustrated in Table III.

TABLE III

| Sample No. | Tensile Lap Shear Strength (psi) | Charpy Side Impact Strength (ft-lbs) |
| --- | --- | --- |
| 8 | 2945 ± 300 | 1.80 |
| C-1* | 1875 ± 300 | 0.74 |

*Not an example of this invention.
C-1 Diglycidyl ether of bisphenol A (EEW = 181) cured with aminoethylpiperazine (1:1 equivalent ratio of epoxide to amino hydrogen).

The data illustrate the improved strength of the polysulfide modified epoxy resins compared to conventional unmodified epoxy resins.

EXAMPLE 10

A. Preparation of a Polysulfide (S)₄ Modified Epoxy Resin

A polysulfide modified epoxy resin is prepared by the method of Example 4 using a (vinylaryl)alkyl polysulfide of the following structure:

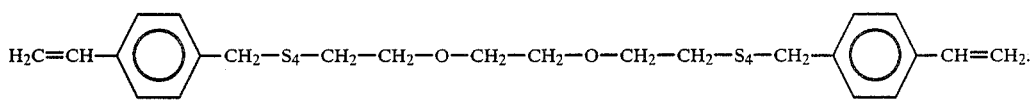

The sample (EEW=236.39) is designated as Sample No. 9.

B. Preparation and Curinq of Coating Formulations Using a Polysulfide Modified Epoxy Resin A pair of coating formulations is prepared as 60 percent by weight solutions of resin in a 53.4 to 46.6 percent by weight solvent mixture of n-butanol and naphtha, respectively. The following components are used in the formulation:

| Resin Source | Resin Weight (grams) | Curing Agent[1] (grams) | Designation of Formulation |
|---|---|---|---|
| 9 | 13.34 | 6.72 | C |
| C-1*[2] | 12.24 | 7.79 | Control |

*Not an example of this invention.
[1]Blend of 93.31 percent by weight Versamid ® 280B75 polyamide adduct (123.5 AHEW) available from the Henkel Corporation and 6.69 percent by weight Genamid ® 2000 amidoamine (81.7 AHEW) available from the Henkel Corporation.
[2]Diglycidyl ether of bisphenol A, EEW of 189, cured and tested in same manner as described in Example 10-B.

A portion of each coating formulation is used to make a cured coated panel prepared and tested by the method of Example 8. The results are reported in Table IV.

TABLE IV

| Formulation | Pencil hardness | Tack free time (hr) | MEK Double Rubs | | | Glacial Acetic Acid Spot Test | | | Gardner reverse impact (in-lб) |
|---|---|---|---|---|---|---|---|---|---|
| | | | Prerub thickness (mil) | Number rubs | Rubs per mil thickness | Pretest thickness (mil) | Number seconds | Seconds per mil thickness | |
| C | 2B | 3.0 | 2.1 | 260 | 124 | 2.0 | 930 | 465 | 112 |
| | | | 2.1 | 270 | 129 | 1.9 | 941 | 495 | |
| Control* | 2B | 6.0 | 2.2 | 300 | 136 | 1.9 | 1252 | 659 | 52 |
| | | | 2.1 | 300 | 143 | 2.0 | 1230 | 615 | |

*Not an example of this invention.

The data illustrate the improved reverse impact strength of the polyamide cured polysulfide modified epoxy resin compared to conventional unmodified epoxy resins, such as the diglycidyl ethers of bi-phenol A.

What is claimed is:

1. A polysulfide modified epoxy resin composition comprising the copolymerization product of an epoxy resin and a (vinylaryl)alkyl substituted polysulfide.

2. The polysulfide modified epoxy resin of claim 1 wherein the epoxy resin comprises an average of at least one three-membered cyclic ether group per molecule.

3. The polysulfide modified epoxy resin of claim 1 wherein the epoxy resin contains no ethylenic unsaturation.

4. The polysulfide modified epoxy resin of claim 1 wherein the (vinylaryl)alkyl substituted polysulfide may be represented by the formula:

$$Z-[S_xR_1]_yS_x-Z$$
$$\quad\ \ |$$
$$\quad\ \ [(S_xR_2)_vS_x-Z]_w$$

wherein $R_1$ and $R_2$ at each occurrence are independently polyvalent organic polyradicals with each valence residing on a carbon atom; each Z is independently (vinylaryl)alkyl, inertly substituted (vinylaryl)alkyl or a non-crosslinking monoradical, provided that at least 5 mole percent of at least one Z group contains (vinylaryl) moieties; y and v are independently zero or a positive integer, x is a number from about 1 to about 8; and w is zero or a positive integer which is the difference between the valence of $R_1$ and two.

5. The polysulfide modified epoxy resin of claim 4 wherein the (vinylaryl)alkyl substituted polysulfide is used in amounts ranging from about 1 to about 99 percent by weight.

6. The polysulfide modified epoxy resin of claim 4 wherein the (vinylaryl)alkyl substituted polysulfide is used in amounts ranging from about 5 to about 50 percent by weight.

7. The polysulfide modified epoxy resin of claim 1 wherein the copolymerization product is cured.

8. A film composition comprising the polysulfide modified epoxy resin of claim 4.

9. The film composition of claim 8 in the form of a protective barrier applied to a solid substrate.

* * * * *